Figure 1:
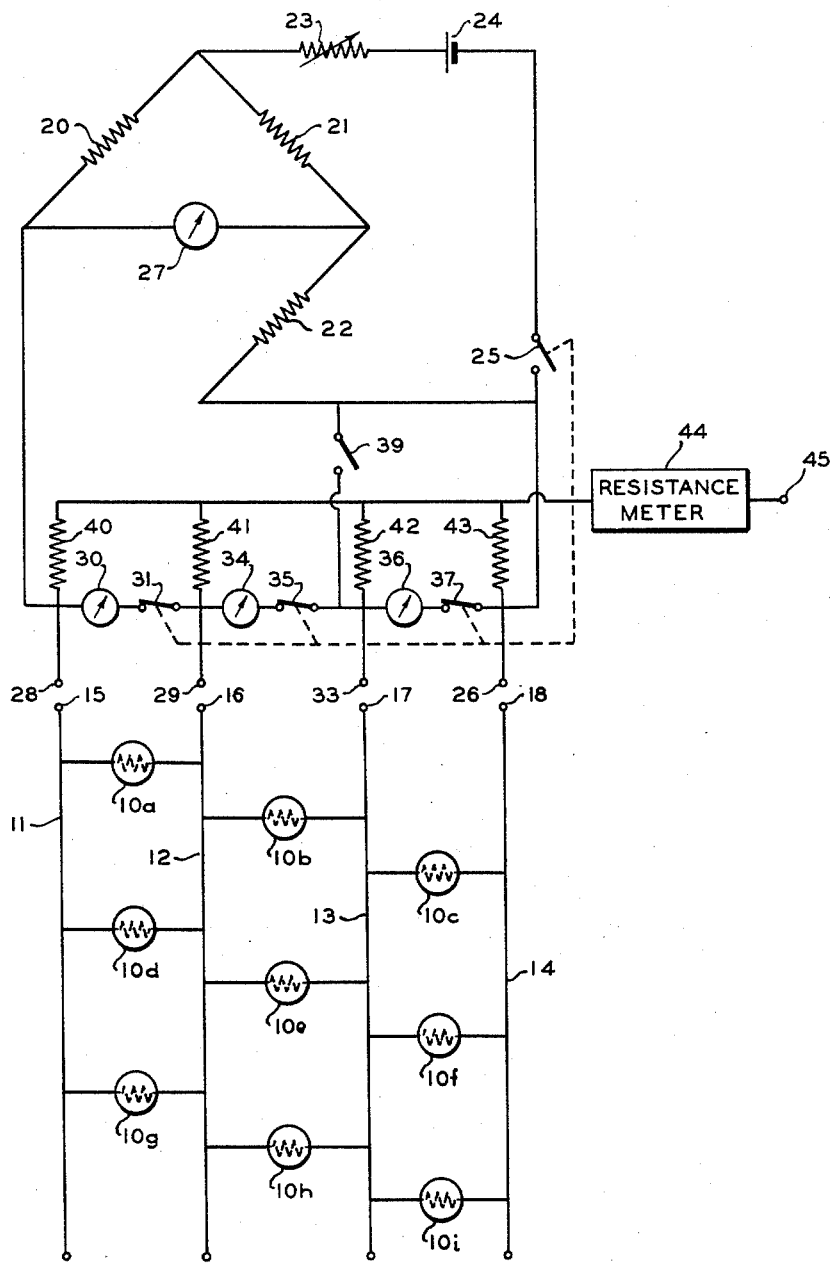

United States Patent Office 2,917,706
Patented Dec. 15, 1959

2,917,706

SEISMOMETER TESTING APPARATUS

Carl D. Thompson, Bartlesville, Okla., assignor to Phillips Petroleum Company, a corporation of Delaware Application July 14, 1955, Serial No. 522,069

8 Claims. (Cl. 324—73)

This invention relates to apparatus for testing seismometers and strings of seismometers.

In seismic prospecting it is customary to fire a charge of explosive at or near the surface of the earth and to detect the resulting earth tremors at a number of locations spaced therefrom. A plurality of seismometers is normally positioned at each of the spaced locations to convert the earth tremors into corresponding electrical pulses. These seismometers often comprise a magnetic circuit having a coil of wire mounted therein so that vibrations incident upon the seismometer result in currents being generated in the coil. For example, an element of the magnetic circuit can be suspended freely in the seismometer housing by resilient means so that sudden impulses received by the housing result in the housing being displaced abruptly relative to the element. This movement changes the flux in the magnetic circuit to induce current in the coil. The seismometers at each of the locations normally are connected to a recording instrument to provide a trace of the vibrations received.

It is important that each seismometer at a given location be connected to the recording apparatus so that the plurality of signals are recorded in phase with one another. The seismometers are constructed so that the polarity of the output terminals are clearly marked. However, these markings may become obliterated after use in the field so as not to be legible. Also, the connecting cables may be broken and not spliced in the correct manner. Furthermore, the coils in the seismometers may break and shorts may occur between the coils and the seismometer housings.

The present invention is directed toward providing simple apparatus which can be used either in the field or during construction to test seismometers and strings of seismometers in a rapid manner. The apparatus comprises an electrical bridge network which is capable of measuring the resistances of the seismometer coils and the total resistance of a connected string of seismometers. Switching means is provided to connect a current responsive instrument selectively across the coils of the seismometers so that the polarities thereof can readily be determined. Apparatus is also provided to measure the resistances between the seismometer coils and housings to detect shorts therebetween.

Accordingly, it is an object of this invention to provide simple, compact apparatus to measure the resistance of seismometers and strings of seismometers.

Another object is to provide apparatus to determine the polarity of seismometers.

A further object is to provide apparatus to test the electrical insulation of seismometer housings.

Figure 2:
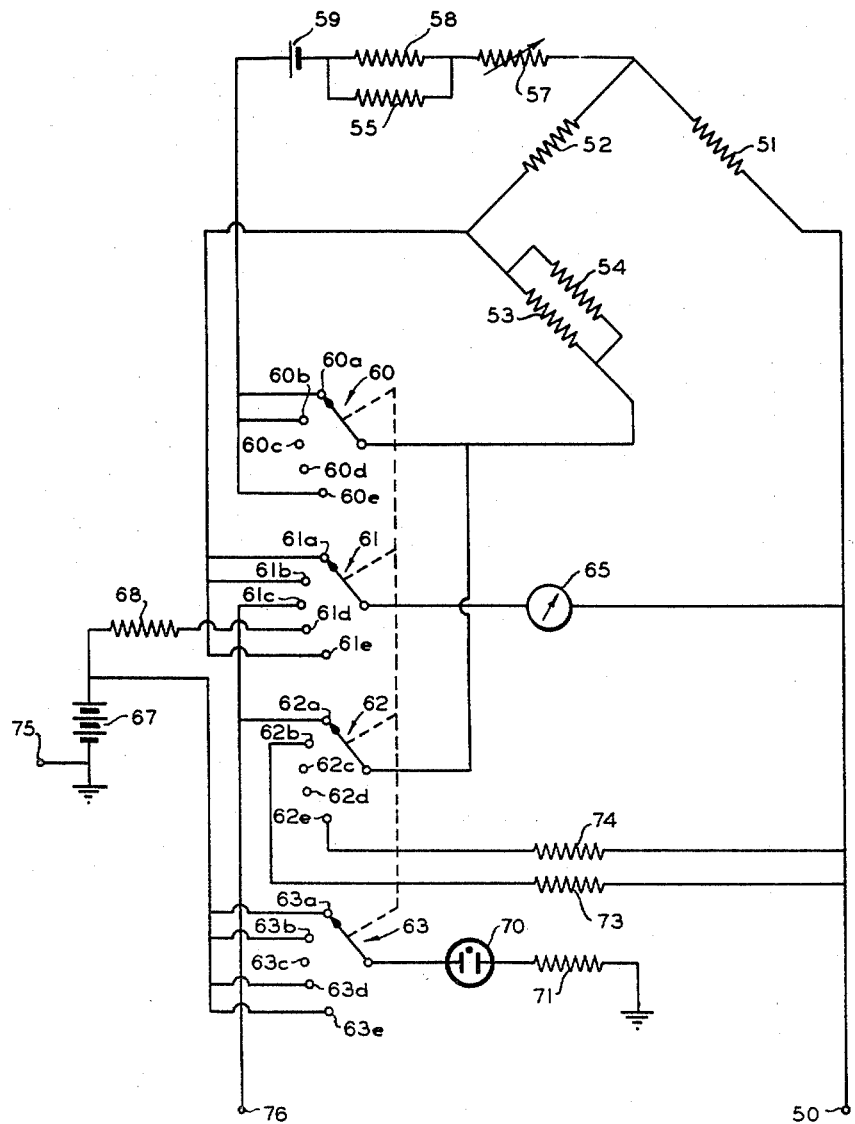

Other objects, advantages and features of the invention should become apparent from the following detailed description taken in conjunction with the accompanying drawing in which:

Figure 1 is a schematic circuit drawing of a first embodiment of the testing apparatus of this invention; and Figure 2 is a schematic circuit drawing of a second embodiment of the testing apparatus.

Referring now to the drawing in detail and to Figure 1 in particular there is shown a string of seismometers $10a$, $10b$, $10c$, $10d$, $10e$, $10f$, $10g$, $10h$ and $10i$. Seismometers $10a$, $10d$ and $10g$, are connected in parallel relationship between cables 11 and 12. Seismometers $10b$, $10e$ and $10h$ are connected in parallel relationship between cables 12 and 13. Seismometers $10c$, $10f$ and $10i$ are connected in parallel relationship between cables 13 and 14. Terminals 15, 16, 17 and 18 are connected to the first ends of respective cables 11, 12, 13 and 14. For purposes of describing the test apparatus of this invetnion it is assumed that each of the seismometers includes a coil of wire of predetermined resistance.

The testing apparatus comprises resistance elements 20, 21 and 22 which are connected in series relationship with one another. A variable resistor 23 is connected between one terminal of a current source 24 and the junction between resistors 20 and 21. The second terminal of current source 24 is connected to the first terminal of a switch 25. The second terminal of switch 25 is connected to an output terminal 26 and to the first end terminal of resistor 22. A galvanometer 27 is connected between the first terminal of resistor 20 and the junction between resistors 21 and 22. The first terminal of resistor 20 is also connected to an output terminal 28. Terminals 26 and 28 are adapted to engage respective terminals 18 and 15 of the seismometer string. Terminal 28 is connected to a third output terminal 29 through a galvanometer 30 and a switch 31. Terminal 29 is connected to a fourth output terminal 33 through a galvanometer 34 and a switch 35. Terminals 33 and 26 are connected to one another through a galvanometer 36 and a switch 37. Terminals 29 and 33 are adapted to engage respective terminals 16 and 17 of the seismometer string. Switches 31, 35, 37 and 25 are mechanically coupled to one another so that switches 31, 35 and 37 are closed when switch 25 is open and vice versa.

Terminals 28, 29, 33 and 26 are connected through respective isolating resistors 40, 41, 42 and 43 to the first input terminal of a resistance meter 44. The second terminal of meter 44 is connected to an output terminal 45. Meter 44 can be a conventional Wheatstone bridge circuit wherein the two external terminals thereof are adapted to be connected across an impedance element to be measured which thereby forms one arm of the bridge. A switch 39 is connected between resistor 22 and terminal 33.

One embodiment of the apparatus thus far described has been constructed to test seismometers having coil resistances of approximately 150 ohms. For this purpose, resistors 20, 21 and 22 each had a resistance of 150 ohms. Resistor 23 was 25 ohms and resisctors 40, 41, 42 and 43 were each 4.7 megohms. Current source 24 was a 1.5 volt battery.

When it is desired to test the total resistance of the seismometer string between terminals 15 and 18, switch 25 is closed and switches 31, 35, 37 and 39 are opened. This results in the seismometer string forming the fourth arm of a bridge network with resistors 20, 21 and 22. Galvanometer 27 is calibrated to indicate the resistance of the seismometer string being tested. If each of the seismometers has a resistance of 150 ohms, the total resistance of the string is 150 ohms. If it is desired to test the resistance of the coil of any one of the seismometers, this particular seismometer can be connected directly between terminals 26 and 28 in place of the entire seismometer string.

When it is desired to test the polarities of the seismometers, switch 25 is opened and switches 31, 35 and 37 are closed. This connects galvanometer 30 in parallel relationship with seismometers 10a, 10d and 10g. Similarly, galvanometer 34 is connected in parallel relationship with seismometers 10b, 10e and 10h, and galvanometer 36 is connected in parallel relationship with seismometers 10c, 10f and 10i. If it is desired to test the polarity of seismometer 10a, for example, this seismometer is positioned upright and suddenly moved in a vertical direction. If the seismometer is connected into the string correctly the galvanometer deflects in a first direction. If the seismometer is connected incorrectly the galvanometer is deflected in the opposite direction. Seismometers 10d and 10g can similarly be tested by noting the deflection of galvanometer 30; and seismometers 10b, 10e and 10h can be tested by noting the deflection of galvanometer 34; and seismometers 10c, 10f and 10i can be tested by noting the deflection of galvanometer 36.

In order to test the insulation of the seismometer housings, terminal 45 of resistance meter 44 is connected to the housing of the particular seismometer to be tested. This results in meter 44 measuring the resistance between the coil in the seismometer and the housing thereof. The resistance is extremely high, open circuit, if the coil is properly insulated from the housing. A short between the seismometer coil and the housing is readily detected by the measured lower resistance, that is, a resistance of the order of 4.7 megohms. Isolating resistors 40, 41, 42 and 43 are employed to prevent a short circuit across meter 44 if the test seismometer is faulty.

In some seismic operations only four seismometers, such as 10a, 10b, 10d and 10e, are employed. When it is desired to test strings of this type, switch 39 is closed so that terminal 33 is connected directly to resistor 22 and switch 25. Otherwise the apparatus operates in the same manner as previously described.

In Figure 2 there is shown a second embodiment of the test apparatus of this invention. The apparatus of Figure 2 is provided with only a pair of output terminals 50 and 76 which are adapted to be connected to the end terminals of the coil of the seismometer being tested or to the cables of a string of seismometers. Terminal 50 is connected to the first terminal of a resistor 51 which is connected in series relationship with a second resistor 52 and a third resistor 53. A resistor 54 is connected in parallel with resistor 53. The second terminal of resistor 53 is connected to the movable arm of a first switch 60 and to the movable arm of a third switch 62. The junction between resistors 51 and 52 is connected through a variable resistor 57 and parallel connected resistors 58 and 55 to the first terminal of a current source 59. The apparatus is provided with two switches 61 and 63 in addition to switches 60 and 62. The movable arm of switch 60 is adapted to engage five stationary contacts 60a, 60b, 60c, 60d, and 60e. The movable arms of switches 61, 62 and 63 are adapted to engage corresponding stationary contacts, as illustrated. The arms of the four switches are mechanically coupled to one another so that corresponding stationary contacts in each of the switches are engaged simultaneously. The second terminal of current source 59 is connected to switch contacts 60a, 60b and 60e. The junction between resistors 52 and 53 is connected to switch contacts 61a, 61b and 61e. The arm of switch 61 is connected through a galvanometer 65 to terminal 50. Terminal 76 is connected to switch contacts 61c and 62a.

The first terminal of a second current source 67 is connected to ground and the second terminal thereof is connected through a resistor 68 to switch contact 61d. The second terminal of current source 67 is also connected directly to contacts 63a, 63b, 63d and 63e. The arm of switch 63 is connected through a current indicating lamp 70 and a resistor 71 to ground. Switch contacts 62b and 62e are connected through respective resistors 73 and 74 to terminal 50. A terminal 75 is connected to the first terminal of current source 67.

In one particular embodiment of this apparatus, the following circuit components were employed: resistors 51, 52 and 53, 150 ohms each; resistor 57, 50 ohms; resistor 58, 150 ohms; resistor 55, 1000 ohms; resistor 54, 2200 ohms; resistor 74, 250 ohms; resistor 68, 470,000 ohms; and resistor 71, 1 megohm. Current source 59 was a 1.5 volt battery and current source 67 was a 90 volt battery.

When it is desired to measure the resistance of a seismometer coil connected between terminals 50 and 76, the ganged switch arms are moved to engage the corresponding a contacts. This results in a Wheatstone bridge circuit being formed wherein the element connected between terminals 50 and 76 forms one arm of the bridge. Galvanometer 65 is calibrated to indicate the resistance of the test element. The bridge circuit itself can be tested by moving the switch arms to engage the corresponding b contacts. This results in resistor 73 forming the fourth arm of the bridge circuit. Resistor 73 is selected to have an ohmic resistance approximately the same as resistors 51, 52 and 53. Shunt resistor 54 results in a small deflection of galvanometer 65. If the circuit is operating properly, the galvanometer deflects a predetermined amount.

When the switch arms are moved to the corresponding c contacts, the instrument is turned off to avoid drain on batteries 59 and 67. The polarity of the seismometers being tested can be determined at this position because galvanometer 65 is connected directly across terminals 50 and 76.

The insulation of the seismometer housings can be tested by moving the switch arms to the corresponding d contacts. Terminal 50 is connected to one terminal of the seismometer coil and terminal 75 is connected to the seismometer housing. If the coil is properly insulated from the housing there is no current flow from battery 67 through resistor 68 and galvanometer 65. The current flow from the battery at this time is through lamp 70. If a short exists in the seismometer housing, current flows through galvanometer 65 to cause a deflection thereof. Lamp 70 may also be turned off.

Batteries 59 and 67 can be tested by moving the switch arms to the corresponding e contacts. This results in resistor 74 being connected across the fourth arm of the bridge circuit. Resistor 54 has a resistance greater than the other three arms of the bridge circuit so that a predetermined deflection of galvanometer 65 is observed if battery 59 is delivering current. Lamp 70 is lighted if battery 67 is delivering current.

From the foregoing description of two preferred embodiments of the testing apparatus of this invention it can be seen that there is provided simple, compact apparatus which can be used either in the shop or in the field to test various electrical properties of individual seismometers and seismometer strings. Through the use of multi-contact switches it is possible to perform a plurality of tests with a minimum number of circuit elements.

While the invention has been described in conjunction with present preferred embodiments, it should be apparent that it is not limited thereto.

What is claimed is:

1. Measuring apparatus comprising first, second and third impedance elements connected in series relationship, a first current source having one terminal connected to the junction between said first and second elements, four switches each having five contacts and a movable arm, means for connecting the movable arms of said switches so that corresponding contacts of said switches are engaged simultaneously, means for connecting the second terminal of said first current source to the first, second and fifth contacts of the first of said switches, means for connecting the first, second and fifth contacts of the second of said switches to the junction between said second and third elements, a first output terminal connected to the third contact of the second of said switches and to the first contact of the third of said switches, a second output terminal connected to the end terminal of said first element which is not connected to said second element, means for connecting the arms of the first and third of said switches to the end terminal of said third element which is not connected to said second element, a first current indicating device connected between said second output terminal and the arm of the second of said switches, a fourth impedance element connected between said second output terminal and the second contact of the third of said switches, a fifth impedance element connected between said second output terminal and the fifth contact of the third of said switches, a second current source having one terminal thereof connected to a reference potential and the second terminal thereof connected to the first, second, fourth and fifth contacts of the fourth of said switches, means for connecting the second terminal of said second current source to the fourth contact of the second of said switches, and a second current indicating device connected between said reference potential and the movable arm of the fourth of said switches.

2. The combination in accordance with claim 1 wherein the impedances of said first, second, third and fourth elements are substantially equal and the impedance of said fifth element differs therefrom.

3. Measuring apparatus comprising first, second and third impedance elements connected in series relationship, a first current source having one terminal connected to the junction between said first and second elements, first, second and third switches each having two contacts and a movable arm, means connecting the movable arms of said switches so that corresponding contacts of said switches are engaged simultaneously, means for connecting the second terminal of said current source to the first contact of said first switch, a first output terminal connected to the first contact of said third switch and the second contact of said second switch, a second output terminal connected to the end terminal of said first element which is not connected to said second element, means for connecting the arms of said first and third switches to the end terminal of said third element which is not connected to said second element, means for connecting that junction between said second and third elements to the first contact of said second switch, and a current indicating device connected between said second output terminal and the arm of said second switch.

4. Measuring apparatus comprising first, second and third impedance elements connected in series relationship, a first current source having one terminal connected to the junction between said first and second elements, first and second output terminals, means for connecting said first output terminal to the end terminal of said first element which is not connected to said second element, means including a first switch connecting said second output terminal to the second terminal of said current source, a third output terminal, a first current indicating device and a second switch connected in series relationship between said first and third output terminals, a second current indicating device and a third switch connected in series relationship between said second and third output terminals, means for connecting said switches together so that said second and third switches are open when said first switch is closed and said second and third switches are closed when said first switch is open, and a third current indicating device connected between the junction between said second and third elements and the end terminal of said first element which is not connected to said second element.

5. The combination in accordance with claim 4 further comprising means to measure the electrical resistance of an element, said means to measure having first and second input terminals, and first, second and third resistors having first terminals thereof connected to one of said input terminals, the second terminals of said first, second and third resistors being connected to said first, second and third output terminals, respectively.

6. Apparatus, for measuring a test element, comprising a circuit that includes a first terminal, first, second, and third impedance elements and a second terminal all connected in series in the order named; a current source having one terminal thereof connected to the junction between said first and second elements; means attached to said first terminal for indicating current; a first switching means for connecting the other terminal of said current source to said second terminal; a second switching means for connecting said means for indicating to said second terminal; a third switching means for connecting said means for indicating to the junction between said second and third impedance elements; and means for operating said second and third switching means in unison thereby to disconnect said means for indicating current from said second terminal when said means for indicating is connected to said junction between said second and third impedance elements.

7. The combination in accordance with claim 6 wherein said current indicating means comprises the current indicating means in said bridge circuit.

8. The apparatus of claim 6 having a test element comprising a seismometer disposed between said terminals.

References Cited in the file of this patent

UNITED STATES PATENTS

| | | |
|---|---|---|
| 703,777 | Fisher | July 1, 1902 |
| 1,593,024 | Macadie | July 20, 1926 |
| 1,954,311 | Fausett | Apr. 10, 1934 |
| 2,101,296 | Simpson et al. | Dec. 7, 1937 |
| 2,423,970 | Gardner | July 15, 1947 |
| 2,577,543 | Saad | Dec. 4, 1951 |
| 2,639,964 | Keinath | May 26, 1953 |